Figure 1:
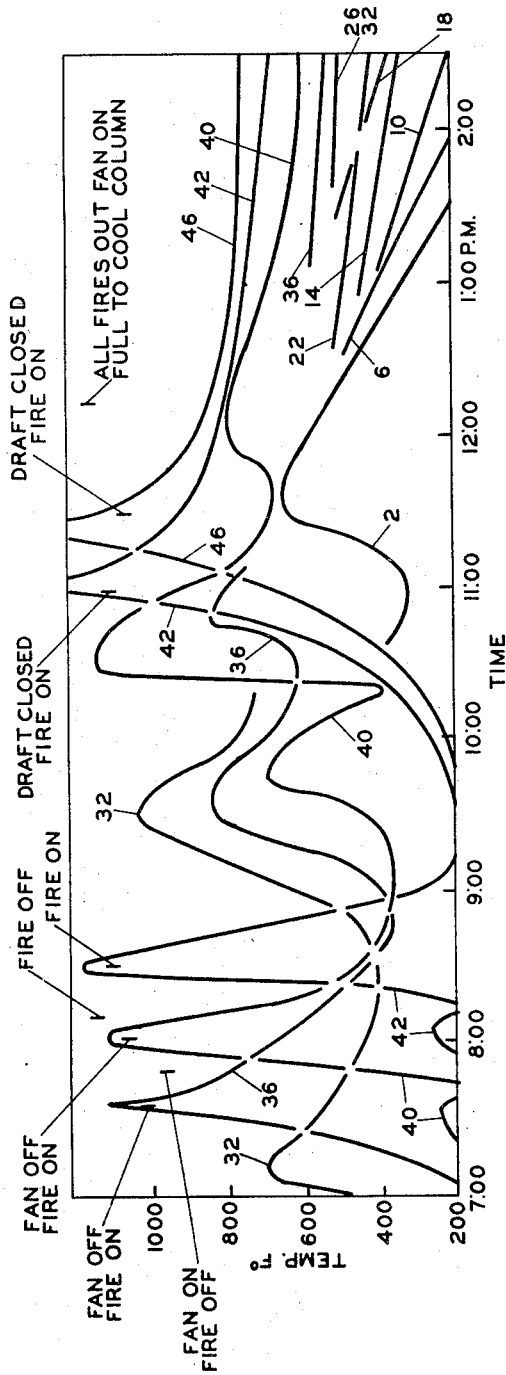
Figure 1:
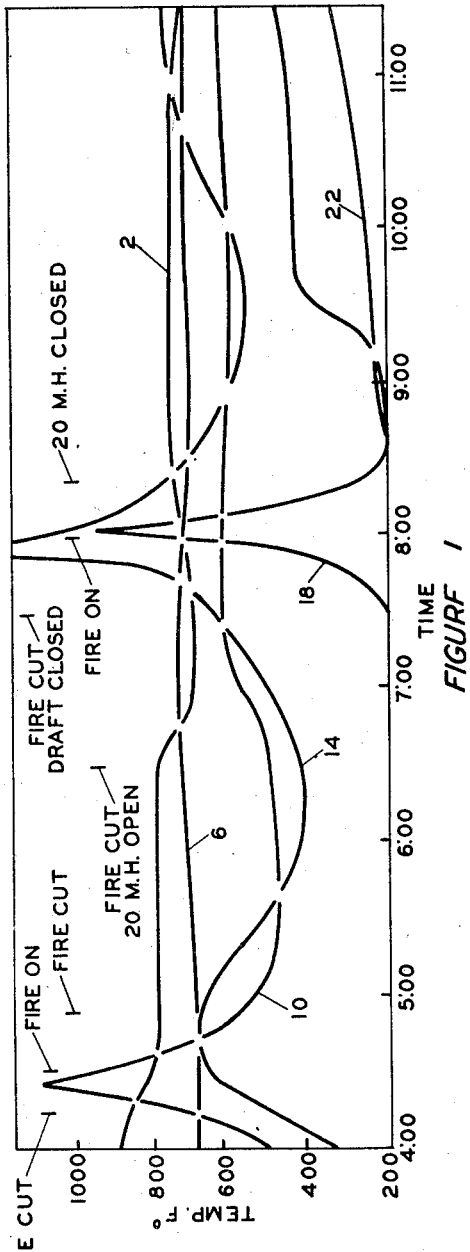
Figure 1A:
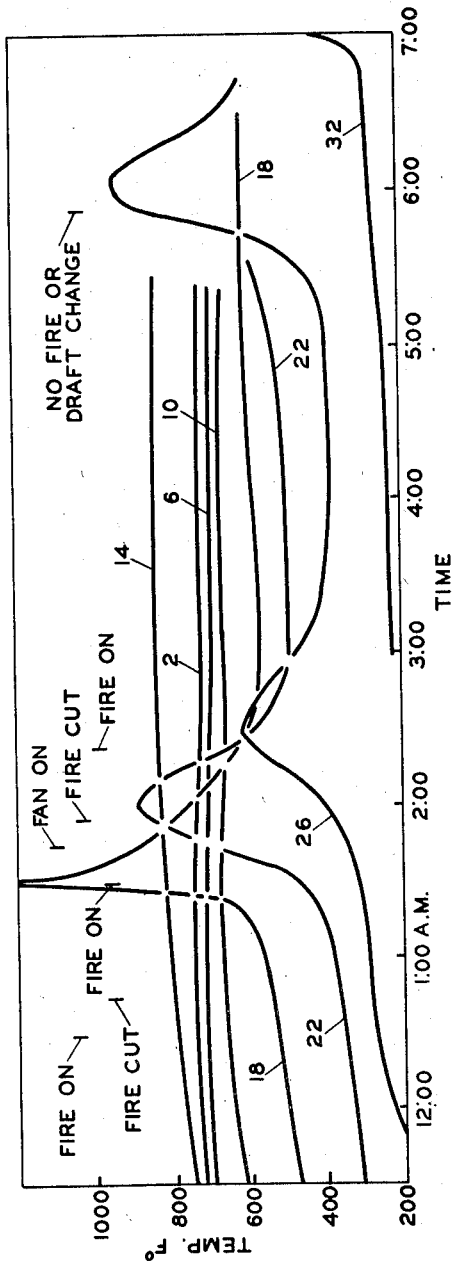
Figure 1A:
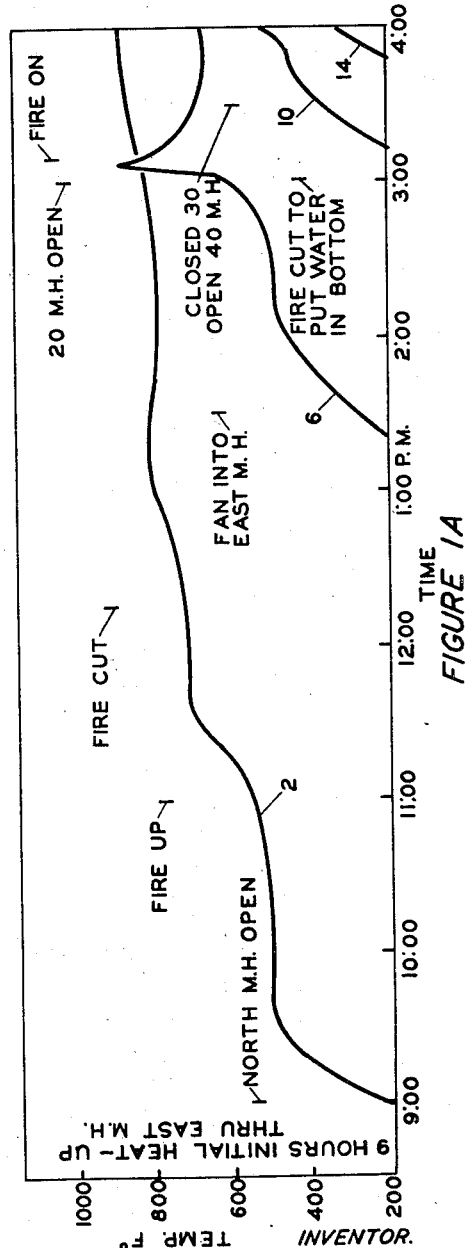

Aug. 7, 1951 E. L. UTSINGER 2,563,085
PROCESS FOR REMOVING SOLID POLYMERIC MATERIAL
FROM PROCESS EQUIPMENT
Filed Jan. 2, 1948 2 Sheets-Sheet 1

INVENTOR.
E. L. UTSINGER DECEASED
ZOE UTSINGER OF BARTLESVILLE
OKLAHOMA ADMINISTRATRIX
BY
ATTORNEYS

Aug. 7, 1951  E. L. UTSINGER  2,563,085
PROCESS FOR REMOVING SOLID POLYMERIC MATERIAL
FROM PROCESS EQUIPMENT
Filed Jan. 2, 1948  2 Sheets-Sheet 2

INVENTOR.
E. L. UTSINGER DECEASED
ZOE UTSINGER OF BARTLESVILLE
OKLAHOMA ADMINISTRATRIX
BY
Hudson & Young
ATTORNEYS Patented Aug. 7, 1951

2,563,085

UNITED STATES PATENT OFFICE 2,563,085

PROCESS FOR REMOVING SOLID POLYMERIC MATERIAL FROM PROCESS EQUIPMENT

Edward L. Utsinger, deceased, late of Bartlesville, Okla., by Zoe Utsinger, administratrix, Bartlesville, Okla., assignor to Phillips Petroleum Company, a corporation of Delaware Application January 2, 1948, Serial No. 345

13 Claims. (Cl. 134—2)

This invention relates to a method for removing organic deposits from processing equipment. In one of its aspects it relates to a method for removing polymers from processing equipment. In one of its more specific aspects it relates to the removal and deactivation of popcorn polymer and popcorn polymer seed.

It is well known that monomeric materials, such as 1,3-butadiene, styrene, etc., will spontaneously polymerize, forming a hard porous opaque material, insoluble in ordinary solvents such as benzene or carbon tetrachloride, and having the remarkable ability to seed itself and/or grow when in contact with liquid or vaporous monomeric materials. This polymer has been referred to in the art as "sponge" or "cauliflower" polymer, and is currently termed "popcorn polymer." The term "popcorn polymer" will be used throughout this specification and the claims to mean a polymer having the above mentioned characteristics and which has somewhat the appearance of popcorn or cauliflower, and as is described in "Initiation and Growth of Butadiene Resinous Polymer" by Welch, Swaney, Gleason, Beckwith, and Howe, Ind. Eng. Chem., vol. 39, No. 7, pp. 826–829, July 1947; and in "Inhibition of Polymerization" by Kharasch, Nudenberg, Jensen, Fischer, and Mayfield, Ind. Eng. Chem., vol. 39, No. 7, pp. 830–837, July 1947. Popcorn polymer may be formed by the polymerization of monomeric material in which an olefinic linkage is conjugated with another olefinic linkage as in the conjugated diolefins, such as 1,3-butadiene, or by the polymerization of compounds in which the olefinic linkage is conjugated with some other type of unsaturated linkage, for example, the unsaturated linkage of an aromatic ring, as in styrene, or a carbon to oxygen double bond as in methyl methacrylate. Copolymerization of the above mentioned materials will also produce the popcorn type of polymer.

There is also a polymer very similar in chemical composition to popcorn polymer formed by the same materials. It is characterized by a somewhat brownish color, and a consistency similar to that of rubber, however, it possesses little elasticity and may be pulled apart readily with the fingers. The major difference between this and popcorn polymer is the absence of a blossoming out action. Both polymers swell when in contact with a monomeric material such as butadiene, however, popcorn polymer goes one step further by bursting into a shape similar to that of popcorn. Both kinds of polymer, of course, have the same ratio of carbon to hydrogen as the monomer. This invention applies to removal and deactivation of both these polymers.

The manufacture, separation, and purification of butadiene and styrene now form the basis of the synthetic rubber industry. In plants, such as described in Hachmuth U. S. Patent 2,386,310, granted October 9, 1945, wherein butadiene is recovered, separated, or purified by processes which involve fractional distillation, the growth of popcorn polymer, in particular, has caused a great deal of trouble. The rapid growth of popcorn polymer not only causes a loss of much valuable material, but also plugs fractionators, lines, pumps, condensers, and other equipment, which may result in the costly shutdown of an entire plant. Furthermore, the increase in size, which occurs when a liquid or vaporous monomeric material is converted into popcorn polymer, produces pressures which are sufficient to cause the rupture of steel lines and deformation of fractionators, etc. In one instance, a nine foot diameter fractional distillation column, containing conventional bubble trays and used for purifying butadiene, was removed from service and cleaned. Some small popcorn polymer seeds were accidentally left on one tray of the column. Within a few months the growth of polymer from these few small seeds was sufficient to entirely plug the 2' x 9' space between the trays, and to deform the beams which supported the uppermost of the two trays. Furthermore, the growth of popcorn polymer has been known to rupture steel lines while they were filled with highly inflammable fluids such as butadiene. The hazards and difficulties which accompany the growth of popcorn polymers are thus readily apparent. Such a mass of polymer must be partially removed manually in an operation which resembles mining. Even so, it is extremely difficult, if not impossible, to remove all the polymer particles; unremoved particles act as seeds and immediately initiate formation of additional popcorn polymer when the unit is put back into service.

The growth phenomenon of popcorn polymer has been studied by many investigators. One hypothesis put forward is that active popcorn polymer contains a relatively large number of groups which can give rise to free radicals. Of such groups, the main ones to be considered in connection with this problem are the peroxidic groups such as hydroperoxides. These are most easily formed when oxygen attacks methylene groups adjacent to aliphatic double bonds. Consequently, the more of these methylene groups present in any polymer the higher is the potential activity of that polymer.

Previously it has been assumed that popcorn polymer must be cleaned from equipment manually, which is a tedious and time consuming undertaking. When such cleaning has been effected, the small remaining particles known as seeds must be deactivated, to prevent rapid formation of new popcorn polymer. One method for accomplishing such deactivation is treating the active seed with one of the oxides of nitrogen. However, this method is not entirely satisfactory, because a great deal of time must be spent to remove manually all but the very small fragment of polymer before deactivation of the seed may be started.

A new and improved process has been discovered for the removal and deactivation of polymers formed by monomeric materials which involves bringing such polymers to ignition temperature and burning them out while controlling the rate of combustion. It has also been found that, under specific conditions, this method can be successfully applied to remove such polymer when present in large fractional distillation columns without harming this low-temperature equipment by strains, resulting from heat developed by the burning.

An object of this invention is to provide a method for removing polymeric material from processing equipment. Another object is to provide a method for removing the polymers of monomeric materials from processing equipment. Another object is to provide a method for removing butadiene popcorn polymer from processing equipment. Another object is to provide a method for removing polymeric material from a fractional distillation column. A further object is to deactivate a monomeric polymer seed. Another object is to deactivate popcorn polymer seed. Other objects and advantages of this invention will become apparent from the accompanying disclosure and discussion.

In the practice of this invention polymer formed by the spontaneous polymerization of monomeric materials, such as, 1,3-butadiene, styrene, etc., is removed from processing equipment by controlled combustion of the polymer, and deactivation of any remaining portions, usually known as seeds.

The idea of removing polymers, and more particularly popcorn polymers, from fractionating and processing equipment by burning has been looked upon with much scepticism by many people, and for what they thought were good reasons. Many fractionating columns and other low temperature equipment are fabricated from carbon steel, and it is necessary to limit the temperatures used in such equipment to about 1000° F. However, it has been found, during the practice of this invention, that flash temperature rises above 1000° F. of short duration will not damage such equipment. It was thought by many that fractionating columns and like equipment, would be warped out of shape and irreparably damaged if a procedure such as is described in this disclosure was carried out. Plant operation of this invention has definitely shown that such scepticism toward this invention was unwarranted, as it has been practiced with no ill effects on equipment, such as a 120 tray fractionating column 9 feet in diameter. This invention provides a quick, effective, and inexpensive method for removing from processing equipment polymeric deposits which lead to damaged equipment, and for deactivating any polymer which may be left in such equipment after burning.

To remove and deactivate polymeric deposits, formed during processing of monomeric vaporous or liquid homocyclic, heterocyclic, and acyclic organic compounds containing conjugated double bonds, from processing equipment in accordance with this invention, the polymer is ignited and burned from the equipment. Processing equipment to be treated is removed from operation, drained and cleaned as by steam and water flooding, to remove substantially all the combustible liquid and/or vapor, and disassembled, if necessary. The equipment is inspected and if excess amounts of polymer are present at specific points it may be necessary to remove a portion of the material manually, as a safety precaution. Hot flue gases or inert gases containing not more than about 5 per cent free oxygen, are admixed with an excess of air and introduced at one end of the equipment. The hot flue gases used should be in a temperature range such that the steel equipment will not be heated above a temperature of about 1000° F. A suitable flue gas-oxygen mixture can be generated within the equipment itself by burning ordinary fuel gas with an excess of air in suitable burners, in a brick firebox, installed to protect the equipment in the zone where the hot gases are generated. In such a case the temperature of the resulting hot, free-oxygen-containing gaseous mixture should not be above a temperature which will heat the equipment above about 1000° F. The mixture of hot gases and air is passed through equipment to be burned out, either by taking advantage of the natural draft created by open ends of the equipment or by forced draft.

In addition to the use of hot flue gas as a means of bringing the polymer to combustion temperature, superheated steam may be substituted, introducing it with a controlled volume of air. The endothermic water gas reaction which will occur at the polymer combustion zone tends to be self-controlling within a range of about 600 to about 1000° F.

Draft control is of vital importance and is affected by numerous variables during the burning. The entire operation requires close observation of conditions and a familiarity with equipment construction and the common rules of drafts and combustion. Forced draft is particularly advantageous when the processing equipment is excessively dirty and the slots and passageways are restricted. In cases such as this, burning out of the equipment by sections may prove expeditious.

When the hot gas-air mixture comes into contact with a deposit of polymer, the temperature of the polymer will be gradually raised until ignition and combustion takes place, at a temperature in the range of about 400 to about 600° F. The ignition temperature appears to vary with the type of polymer. The temperature in the polymer combustion zone is maintained in the range of about 600 to about 1000° F. by controlling the oxygen content of the flue gas. The ideal situation would be to maintain a continuous even temperature between about 800 and about 1000° F. after the polymer has become ignited. This condition, however, is difficult if not impossible to maintain due to varying amounts of polymer, water entrainment, and lag in oxygen control. As combustion proceeds, the temperature tends to rise and in some instances this rise is very rapid, approaching runaway conditions.

Such flash runaways may be controlled by increasing the gas supply to the flue-gas generator to reduce the oxygen content. It has been found that flash runaways of short duration will not damage the steel equipment as will be more specifically illustrated hereinafter. The temperature in a combustion zone is controlled by the oxygen content of the hot gases introduced to the equipment. This may be done in several ways. In extreme cases, the air may be shut off completely, snuffing out the combustion. This step, however, is undesirable and should only be used in the event polymer combustion gets completely out of hand, because the unburned polymer may be blanketed with a layer or coating of partially burned polymer which is very difficult to reignite. Usually variation of the oxygen content of the hot gases is sufficient to control the combustion temperature within the desired range. The polymer combustion zone is usually somewhat localized, progressing through the equipment as each portion is burned out. However, in some cases the combustion zone will become too large and may be controlled by introducing steam at the upper end of the zone. The process of burning is continued until the combustion zone reaches the end of the equipment which is then maintained at a temperature of about 600° F. for about 2 hours.

In practicing this invention, it is very desirable to have a high speed multipoint temperature recording instrument in operation on the piece of equipment being burned out. Temperature recording apparatus such as thermocouples are installed at strategic points along the equipment being burned out. Such temperature recording apparatus will indicate the progress of the polymer combustion zone through the equipment, and will also indicate too fast temperature rises so that an operator may make the proper adjustments for temperature control. The recording equipment may also be used in combination with a controlling instrument to perform any one or a combination of the following: controlling the gas and/or steam rate, controlling the air rate, controlling the injection of the steam through a manifold along the equipment, in the case of treating fractionating column, and for various other controls.

The flue gas used may be obtained in any of several ways, whichever is most satisfactory. Suggested methods are from waste refinery flue gases, gases produced in a dutch oven, or gases produced in the equipment itself, in which is constructed a temporary combustion zone by means of brick, and placing a gas burner therein. In some instances, it may be necessary to introduce air by means of fans or blowers.

For a more clear understanding of this invention and how it may be applied, the following description and discussion of an actual burning out operation is given. A 50 tray section of a fractional distillation column, in which butene-1 was separated from 1,3-butadiene, was taken off stream and prepared for burning out; cleaning the column of explosive materials was accomplished by steam and water flooding. Product lines, and all other lines attached to the column were closed off in such a manner that the burning would take place only in the column and could not possibly enter any such lines. Steam was introduced into the column through 2 inch lines and allowed to escape through the 20 inch lines at the top of column which were slightly opened. Steam pressures of about 15 to about 65 pounds per square inch were maintained within the column for approximately 18 hours. Following this the column was flooded by completely filling it with water and drained immediately with each tray drain open. The column was then tested safe and cleared for burning out. The attached graph on Figures 1 and 1—A was taken from a 12 point high speed temperature recorder. By means of thermocouples on trays 2, 6, 10, 14, 18, 22, 26, 32, 36, 40, 42, and 46, a sequential record of temperature rises in the different zones of the column was obtained for the complete operation. Figures 1 and 1—A are to be read in conjunction with one another, and so that the time coordinate is in sequence. The numbers on the various curves indicate the number of the tray for which the curve was recorded. As will be noticed in the first section of the chart there are notations, such as, North M. H. Open, and Fan Into East M. H. These are manholes located at the bottom of the column and facing in the direction indicated. Other notations, such as, Closed 30 Opened 40 M. H., indicate closing or opening of manholes located in the area just above the tray number indicated.

Hot flue gases generated at the bottom of the column in a furnace of fire brick, built within the bottom of the distillation column, were passed through the column, gradually raising the temperature of the polymers nearest the bottom of the column to ignition temperature, which was approximately 550° F. The extremely high peaks of some of the temperature curves indicate an excess of oxygen in the hot gases. The temperature rises were so sudden in some instances that the air which was used to supply oxygen to support the burning could not be decreased in time. It is necessary to have an adequate damper arrangement so that rapid control of the air stream may be effected. It will be noted that in every case of rapid temperature rise that the temperature dropped immediately when the oxygen was shut off and the fuel gas increased. A knowledge of the amount of polymer in any given section of the column may be gained from the temperature and the time of burning, for instance, referring to the temperature curve for tray 40 at the time of about 10:30 a. m. as shown in Figure 1—A, it may be seen that the time of the flash runaway was about 30 minutes. During this time the temperature rose to about 1150° F. The length of this runaway indicates a large volume of polymer present. When the polymer becomes ignited, as may be seen by the temperature curves, it burns with an intense heat, however, not with flames, but with a glow like charcoal. It is not desirable to extinguish the burning altogether, so reduction of combustion must be obtained by judicious control of air and hot gases. High temperatures such as are obtained in flash runaways, and as are indicated on the attached chart, do not necessarily indicate that the steel column is also that hot. The shorter flash runaways indicate a smaller volume of polymer present, as shown, for instance, in temperature curve 18 at about 1:30 a. m. on Figure 1. Obviously, heavier deposits of polymer require a close control of oxygen to prevent excessive temperatures. A deposit of polymer over several trays will burn progressively with a restricted amount of oxygen so long as the temperature is held above the ignition temperature.

Draft control was effected primarily through the manholes at the bottom of the column and was varied somewhat by opening or closing manholes up the side of the column. Normally there is a strong natural draft through such a column, however, under certain conditions a fan installed in one or more of the manholes may speed up the burning considerably. This is particularly true in the earlier part of the operation when a column may be so dirty as to restrict the normal draft. In such cases, burning by opening a side manhole may be advantageous. The use of side manholes in such a manner must be done carefully and full safety precautions should be taken, particularly to providing a means for closing the manholes from a safe distance. It would be preferable to have such side manholes hinged in a manner to facilitate closing.

Hot flue gases were continuously generated until the last trace of smoke from the combustion of the polymer disappeared indicating that it had been completely burned. The furnace was then shut off and a blower started to aid in circulating cool air through the column. The lower column trays cooled off immediately and were at a temperature below 100° F. in about 3 hours. The top of the column, however, required about 18 hours to cool down to 100° F. A thorough inspection of the column after the cooling revealed that it was clean and in good condition. No excessive oxidation from burning was found and all the welded seams were sound. After the inspection, the column was put on stream again and operated very satisfactorily.

The invention disclosed herein provides a simple, rapid and inexpensive method for removing polymer formed during the processing of monomeric materials; and the deactivation of polymer and their seed, comprising one or more compounds in which the olefinic linkage is conjugated with another similar olefinic linkage such as in the conjugated diolefins, or compounds in which the olefinic linkage is conjugated with some other type of unsaturated linkage such as an unsaturated aromatic ring.

This invention has been described and exemplified in terms of its preferred modifications. It is understood that various changes may be made without departing from the spirit or scope of the disclosure or of the claims.

What is claimed is:

1. A process for removing butadiene popcorn polymer from an iron bubble-tray fractional distillation column, which comprises freeing said distillation column from liquid and gaseous hydrocarbons, installing a combustion zone in the bottom of said distillation column, burning a fuel in said combustion zone in the presence of an excess of air to produce hot flue gas containing free oxygen, passing said hot flue gas upwardly through said distillation column into contact with butadiene popcorn polymer container therein, burning said polymer with oxygen contained in said flue gas, and whenever any point within said distillation column approaches 1000° F. decreasing the free oxygen content of said hot flue gas sufficiently to inhibit development of a temperature in excess of about 1000° F.

2. In the process of claim 1, decreasing the free oxygen content of said hot flue gas by increasing the fuel supplied to said combustion zone, while maintaining a constant supply of air thereto, whereby said excess of air is decreased.

3. A process for removing and deactivating butadiene popcorn polymer and the seeds thereof, present in a fractional distillation column, which comprises freeing said distillation column of liquid and gaseous combustible materials, passing a mixture of superheated steam and an excess of air upward through said distillation column into contact with butadiene popcorn polymer contained therein, burning said polymer with oxygen contained in said steam-air mixture, and whenever any point within said distillation column approaches about 1000° F. decreasing the free oxygen content of said steam-air mixture sufficiently to inhibit development of a temperature in excess of about 1000° F.

4. A process for removal and deactivation of butadiene polymers and their seeds present in butadiene processing equipment, which comprises passing a mixture of hot flue gas and air through said processing equipment, raising the temperature of said butadiene polymer to the ignition point so that combustion takes place, controlling the rate of said combustion in such a manner that the temperature does not exceed about 1000° F., and maintaining a temperature of about 600° F. for about two hours at the outlet of said processing equipment, after completion of said combustion.

5. A process according to claim 4 in which butadiene polymer is present in a bubble-tray fractional distillation column.

6. A process for removal and deactivation of butadiene polymers and their seeds, known as popcorn polymers and found in butadiene processing equipment, which comprises passing a mixture of hot flue gas and air through a processing zone containing such polymer, raising the temperature of said polymer to the ignition point so that combustion takes place, controlling the rate of said combustion in such a manner that the temperature does not exceed about 1000° F., and maintaining a temperature of about 600° F. for about two hours at the outlet of said processing equipment after completion of said combustion.

7. A process for removal and deactivation of butadiene polymers and their seeds, known as popcorn polymers and found in butadiene processing equipment, which comprises passing a mixture of superheated steam and air through a processing zone containing such polymer, raising the temperature of said butadiene polymer to the ignition point so that combustion takes place, controlling the rate of said combustion in such a manner that the temperature does not exceed about 1000° F., and maintaining a temperature at the outlet of said processing equipment of about 600° F. for about two hours after completion of said combustion.

8. A process according to claim 7 in which said butadiene popcorn polymer is present in a bubble-tray fractional distillation column used for fractionating butadiene.

9. A process for removing and deactivating butadiene popcorn polymers and their seeds found in processing equipment, which comprises passing a mixture of hot gases comprising less free oxygen than is normally present in air through a processing zone containing said polymer, raising the temperature of said polymer to the ignition point so that combustion takes place, controlling the rate of said combustion in such a manner that the temperature does not exceed about 1000° F., and maintaining a temperature at the outlet of said processing equipment of about 600° F. for about two hours after completion of said combustion.

10. A process for removing and deactivating polymers and their seeds found in processing equipment, which comprises passing a hot gaseous mixture comprising free oxygen in an amount of not more than about 5 per cent and air through a processing zone containing butadiene popcorn polymer, raising the temperature of said polymer to the ignition point so that combustion takes place, and controlling the rate of said combustion in such a manner that the temperature does not exceed about 1000° F.

11. The process according to claim 10 in which said polymers and their seeds are present in, and so removed from, a bubble-tray fractional distillation column.

12. A process for removing and deactivating butadiene polymers and their seeds found in butadiene processing equipment, which comprises passing a mixture of hot inert gases and air through processing equipment, raising the temperature of a butadiene polymer to the ignition point so that combustion takes place, controlling the rate of said combustion in such a manner that the temperature does not exceed about 1000° F., and maintaining a temperature at the outlet of said processing equipment of about 600° F. for about two hours after completion of said combustion.

13. A process for removing and deactivating popcorn polymers and their seeds found in processing equipment, which comprises passing a mixture of hot substantially inert gases and air through processing equipment, raising the temperature of popcorn polymer to the ignition point so that combustion takes place, controlling the rate of said combustion in such a manner that the temperature does not exceed about 1000° F., and maintaining a temperature at the outlet of said processing equipment of about 600° F. for about two hours after completion of said combustion.

ZOE UTSINGER,
*Administratrix of the Estate of Edward L. Utsinger, Deceased.*

REFERENCES CITED

The following references are of record in the file of this patent:

UNITED STATES PATENTS

| Number | Name | Date |
|---|---|---|
| 2,289,351 | Dixon | July 14, 1942 |
| 2,423,157 | Reiss | July 1, 1947 |

OTHER REFERENCES

Kharasch et al.: "Inhibition of Polymerization," Ind. Eng. Chem., vol, 39, No. 7, pages 830–837. July 1947.